United States Patent
Bocharov et al.

(10) Patent No.: US 7,617,010 B2
(45) Date of Patent: Nov. 10, 2009

(54) DETECTING INSTABILITIES IN TIME SERIES FORECASTING

(75) Inventors: Alexei V. Bocharov, Redmond, WA (US); David M. Chickering, Bellevue, WA (US); David E. Heckerman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/319,894

(22) Filed: Dec. 28, 2005

(65) Prior Publication Data

US 2007/0150077 A1    Jun. 28, 2007

(51) Int. Cl.
*G05B 13/02*    (2006.01)
(52) U.S. Cl. .............. 700/29; 700/30; 703/2; 703/6
(58) Field of Classification Search .......... 700/29, 700/30; 703/2, 6
See application file for complete search history.

(56) References Cited

U.S. PATENT DOCUMENTS

| | | | |
|---|---|---|---|
| 5,544,281 A | 8/1996 | Maruoka et al. | |
| 5,809,499 A | 9/1998 | Wong et al. | |
| 5,835,682 A * | 11/1998 | Broomhead et al. | 706/14 |
| 5,949,678 A | 9/1999 | Wold et al. | |
| 6,125,105 A | 9/2000 | Edwards et al. | |
| 6,336,108 B1 | 1/2002 | Thiesson et al. | |
| 6,345,265 B1 | 2/2002 | Thiesson et al. | |
| 6,363,333 B1 * | 3/2002 | Deco et al. | 702/191 |
| 6,408,290 B1 | 6/2002 | Thiesson et al. | |
| 6,496,816 B1 | 12/2002 | Thiesson et al. | |
| 6,529,891 B1 | 3/2003 | Heckerman | |
| 6,532,454 B1 | 3/2003 | Werbos | |
| 6,560,586 B1 | 5/2003 | Liang et al. | |
| 6,574,587 B2 * | 6/2003 | Waclawski | 702/186 |
| 6,735,580 B1 * | 5/2004 | Li et al. | 706/21 |
| 6,742,003 B2 | 5/2004 | Heckerman et al. | |
| 6,778,929 B2 * | 8/2004 | Egi | 702/104 |
| 6,807,537 B1 | 10/2004 | Thiesson et al. | |
| 6,853,920 B2 | 2/2005 | Hsiung et al. | |
| 6,882,992 B1 | 4/2005 | Werbos | |
| 6,928,398 B1 * | 8/2005 | Fang et al. | 703/2 |
| 6,987,865 B1 | 1/2006 | Szeliski et al. | |
| 7,092,457 B1 | 8/2006 | Chugg et al. | |
| 7,139,703 B2 | 11/2006 | Acero et al. | |
| 2002/0072882 A1 | 6/2002 | Kruger et al. | |
| 2003/0039867 A1 | 2/2003 | Berger et al. | |
| 2003/0046038 A1 | 3/2003 | Deligne et al. | |
| 2003/0055614 A1 | 3/2003 | Pelikan et al. | |

(Continued)

OTHER PUBLICATIONS

U.S. Appl. No. 10/463,145, filed Jun. 17, 2003, Thiesson, et al.

(Continued)

*Primary Examiner*—Albert DeCady
*Assistant Examiner*—Tejal Gami
(74) *Attorney, Agent, or Firm*—Lee & Hayes, PLLC

(57) ABSTRACT

A predictive model analysis system comprises a receiver component that receives predictive samples created by way of forward sampling. An analysis component analyzes a plurality of the received predictive samples and automatically determines whether a predictive model is reliable at a time range associated with the plurality of predictive sample, wherein the determination is made based at least in part upon an estimated norm associated with a forward sampling operator.

20 Claims, 11 Drawing Sheets

U.S. PATENT DOCUMENTS

| | | | |
|---|---|---|---|
| 2003/0065409 | A1 | 4/2003 | Raeth et al. |
| 2003/0176931 | A1 | 9/2003 | Pednault et al. |
| 2004/0068199 | A1 | 4/2004 | Echauz et al. |
| 2004/0068332 | A1 | 4/2004 | Ben-Gal et al. |
| 2004/0101048 | A1 | 5/2004 | Paris |
| 2004/0260664 | A1 | 12/2004 | Thiesson et al. |
| 2005/0015217 | A1 | 1/2005 | Weidl et al. |
| 2005/0096873 | A1 | 5/2005 | Klein |
| 2006/0074558 | A1 | 4/2006 | Williamson et al. |
| 2006/0129395 | A1 | 6/2006 | Thiesson et al. |
| 2006/0247900 | A1* | 11/2006 | Brocklebank ............... 702/189 |
| 2007/0150077 | A1 | 6/2007 | Bocharov et al. |
| 2008/0010043 | A1 | 1/2008 | Thiesson et al. |

OTHER PUBLICATIONS

U.S. Appl. No. 10/102,116, filed Mar. 19, 2002, Meek, et al.

Craig F. Ansley, "An algorithim for the exact likelihood of a mixed autoregressive-moving average process", 1979, pp. 59-65, Biometrika, printed in Great Britain.

D. Heckerman, et al., "Casual Independence for Probability Assessment and Interference Using Bayesian Networks", IEEE Transactions on Systems, Man and Cybernautics, Nov. 1996, pp. 926-831, vol. 26, Issue 6.

D. M. Chickering, et al.,"Efficient Determination of Dynamic Split Points in a Decision Tree", Proceedings of the IEEE International Conference on Data Mining. Nov. 29-Dec. 2, 2001, pp. 97-98.

D. Heckerman, et al., "Dependency Networks for Interference, Collaborative Filtering, and Data Visualization", The Journal of Machine Learning Research, Sep. 2001, pp. 49-75, vol. 1.

Andrew W. Moore, et al., Efficient Locally Weighted Polynomial Regression Predictions, Proc. 14th International Conference on Machine Learning, 1997, 9 pages.

Sam-Joo Doh, et al., Inter-Class MLLR for Speaker Adaptation, 2000, 4 pages.

Olivier Siohan, et al., Structural Maximum a Posteriori Linear Regression for Fast HMM Adaptation, 2000, 8 pages.

Kai Ming Ting, et al., Theory Combination: an Alternative to Data Combination, 1966, 22 pages.

Neil A. Gershenfeld and Andreas S. Weigend, The Future of Time Series: Learining and Understanding, Time Series Prediciton, 1994, pp. 1-70, Addison Wesley, New York, NY.

P. A. W. Lewis, et al., Modeling Time Series by Using Mutivariate Adaptive Regression Splines (MARS), Time Series Prediction, 1994, pp. 297-318, Addison Wesley, New York, NY.

Howell Tong, Threshold Models in Non-Linear Time Series Analysis, 1983, 323 pages, Springer-Verlag, New York, NY.

Aram Karalic. Employing Linear Regression in Regression Tree Leaves. European Conference on artificial Intelligence, 1992, pp. 1-2.

Hugh Chipman, et al. Bayesian Treed Models. Feb. 2001, pp. 1-29.

George Kapetanios. Threshold Models for Trended Time Series, 1999, pp. 1-32.

Felix A. Gers. Applying LSTM to Time Series Predictable Through Time-Window Approaches, 2001, pp. 1-8.

Kenneth O. Cogger. Modern Regression Methods: A Comparative Discussion. Apr. 19, 2001. pp. 1-12.

David Maxwell Chickering. A Bayesian Approach to Learning Bayesian Networks with Local Structure. Aug. 1997, pp. 1-19.

C. Berzuini and C. Larizza, "A Unified Approach for Modeling Longitudinal and Failure Time Data, with Application in Medical Monitoring." IEEE Transactions on Pattern Analysis and Machine Intelligence. Feb. 1996. vol. 18, Issue 2, pp. 109-123.

C. Meek, "Annotated Bibliography of Papers by Christopher Meek." Mar. 2005. Printed Dec. 28, 2006. http://research.microsoft.com/~meek/mypapers.htm.

C. Meek, et al., "Autogressive Tree Models for Time-Series Analysis." Jan. 10, 2002. http://research.microsoft.com/~meek/papers/dmart.ps&pub=63.

Bach, et al., Learning Graphical Models For Stationary Time Series, (2004), IEEE Transactions On Signal Processing, to appear.

Thiesson, et al. ARMA Time Series Modeling with Graphical Models. Proceedings of the Twentieth Conference on Uncertainty in Arificial Intelligence, 2004, pp. 552-560. AUAI Press.

Thiesson, et al. Efficient Gradient Computaion for Conditional Gaussian Models. Proceedings of 10th Int'l Workshop on Artificial Intelligence and Statistics. The Society for Artificial Intelligence and Statistics, Jan. 2005.

Dean, et al. Probabilistic Temporal Reasoning, Technical Report, May 1988, Brown University, pp. 524-528.

Cooper, et al., A Model For Temporal Probabilistic Reasoning (Technical Report KSL-88-30), (1988), Stanford University, Section On Medical Informatics, Stanford, California.

Dempster, et al. Maximum Likelyhood for Incomplete Data Via the EM Algorithm, 1997, Journal of the Royal Statistical Soceity, B39, pp. 1-38.

Penzer, et al., The Exact Likelihood Of An Autoregressive-Moving Average Model With Incomplete Data, (1997), Biometrika, p. 84, 919-928.

Seeger. Bayesian Gaussian Process Models: PAC-Bayesian Generalization Error Bounds and Sparse Approximation, Jul. 2003.

Ghahramani. Learning Dynamic Bayesian Networks. In Adaptive Processing Of Sequences And Data Structures. Lecture Notes in Artificial Intelligence, (1998), p. 168-197, Springer-Verlag, Berlin.

Lauritzen, et al., Stable Local Computation With Conditional Gaussian Distributions, Statistics and Computing, (2001), pp. 11, 191-203.

Jones. Maximum Likelyhood Fitting of ARMA Models to Time Series with Missing Observations. 1980, Technometerics, pp. 389-395.

Binder, et al. Adaptive Probabilistic Networks with Hidden Variables, Machine Learning, 1997, pp. 213-244.

* cited by examiner

DETECTING INSTABILITIES IN TIME SERIES FORECASTING

CROSS REFERENCE TO RELATED APPLICATION

This application is related to U.S. patent application Ser. No. 10/102,116, filed on Mar. 19, 2002, and entitled "BAYESIAN APPROACH FOR LEARNING REGRESSION DECISION GRAPH MODELS AND REGRESSION MODELS FOR TIME SERIES ANALYSIS." The entirety of this application is incorporated herein by reference.

BACKGROUND

Storage capacity on computing devices has increased tremendously over a relatively short period of time, thereby enabling users and businesses to create and store a substantial amount of data. For example, hard drive space on today's consumer computers is in the order of hundreds of gigabytes. Servers and other higher-level devices can be associated with a significantly greater amount of storage space. As individuals and businesses have become more dependent upon electronic storage media to retain data, use of data analysis tools has increased dramatically. Many businesses today support data storage units that include astronomically large amounts of information. This information can include data relating to sales of an item, ordering, inventory, workflow, payroll, and any other suitable data. Such data can be analyzed (or mined) to learn additional information regarding customers, users, products, etc, wherein such analysis allows businesses and other users to better implement their products and/or ideas. With the advent of the Internet, and especially electronic commerce ("e-commerce") over the Internet, the use of data analysis tools has increased. In e-commerce and other Internet and non-Internet applications, databases are generated and maintained that have large amounts of information. As stated above, information within the databases can be mined to learn trends and the like associated with the data.

Predictive models employed to predict future values with respect to particular variables in data have become prevalent and, in some instances, uncannily accurate. For example, predictive models can be employed to predict price of stock at a future point in time given a sufficient number of observed values with respect to disparate times and related stock prices. Similarly, robust predictive models can be employed to predict variables relating to weather over a number of days, weeks, months, etc. Predictions output by such models are then heavily relied upon when making decisions. For instance, an individual or corporation may determine whether to buy or sell a stock or set of stocks based upon a prediction output by the predictive model. Accordingly, it is often imperative that output predictions are relatively accurate.

Thus, while conventional time-series predictive models can be useful in connection with predicting values of variables in the future, often such models can create predictions that are far outside a realm of possibility (due to instability in underlying data or predictions output by the predictive model). There is, however, no suitable manner of testing such models to ascertain where (in time) these predictions begin to falter. For instance, a database at a trading house can be maintained that includes prices of several stocks at various instances in time. A predictive model can be run with respect to at least one stock on the data, and prices for such stock can be predicted days, weeks, months, or even years into the future using such model. However, at some point in time the predictive model can output predictions that will not be commensurate with real-world outcomes. Only after passage of time, however, will one be able to evaluate where in time the model failed (e.g., how far in the future the predictive model can output predictions with value). Therefore, a predictive model may be accurate up to a certain point in time, but thereafter may become highly inaccurate. There is no mechanism, however, for locating such position in time (e.g., three weeks out) that the predictive model begins to output faulty predictions.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates generally to predictive models, and more particularly to analyzing predictive models and data associated therewith to determine how far into future the predictive model can output usable, reliable predictions. In particular, instability associated with data and/or predictions utilized in connection with forward sampling can cause a predictive model to output predictions that are unreliable and unusable. Thus, while the predictive model may be well designed, such model may output unreliable predictions after a certain number of steps when forward sampling is employed due to instability or non-linearity of data underlying the predictions. The claimed subject matter enables an automatic determination to be made regarding which step the predictive model no longer outputs reliable or usable predictions. Such determination can be made through analyzing a norm of a forward sampling operator, wherein the norm refers to ratio of divergence between two disparate time steps associated with the predictive model.

Forward sampling generally refers to utilizing predicted values as observed values, and predicting values for at least one variable at a next instance in time based at least in part upon the predicted values. In more detail, given a certain number of observed values in a time-series, a predictive model can output a prediction for a next instance in time in the time-series with respect to at least one variable. The predictive model can then utilize the predicted value as an observed value and predict a value for the variable at a next instance of time in the time series. Thus, a "step" of a forward sampling algorithm refers to utilization of the forward sampling algorithm to create a prediction at a future instance in time. In contrast, a "step" of a predictive model can refer to a series of data points going forward in time.

Each step of the forward sampling algorithm can be viewed as an application of a forward sampling operator against previously collected/generated probability distributions and samples. The forward sampling operator can be analyzed to determine a divergence of predictive model with respect to certain data at particular instances in time. Divergence is a generic measure of how varied sampled values will be as a result of applying the forward sampling operator. As will be appreciated by one skilled in the art, variance or L1 distance can be employed as measures of divergence. The rate of change of divergence can be employed to determine when predictions are unreliable. For instance, if variance is employed as a divergence measure, and at time t variance of sampled points is 10, while the variance of the sampled points at time t+1 is twenty, then the (variance-based) norm of the forward sampling operator at time t is 2. The norm of the forward sampling operator can be measured at each time step, and when the measured norm surpasses a threshold, predictions from that time step forward can be labeled unreliable. In another example, a prediction at a certain time step can be labeled unreliable if the measured norm remains above a threshold for a specified number of steps into the future. For example, as the forward sampling operator may be non-linear, a derivative of the forward sampling operator can be analyzed (if differentiable), and a norm of the operator can be obtained with respect to a particular sample (e.g., prediction).

Upon determining the rate of change of divergence (e.g. the norm), such rate can be analyzed with respect to a threshold. For instance, a rate of change of divergence below the threshold can indicate that the predictive model is outputting valuable, reliable predictions at a certain step of the model. However, a rate of change of divergence above the threshold can indicate problems with the predictive model, and the model can be halted at a step associated with a rate of change of divergence that is above the threshold. In another example, a rate of change of divergence above the threshold may simply be an anomaly, and the predictive model can generate accurate, useful predictions at subsequent steps. Accordingly, the rate of change of divergence can be analyzed at subsequent steps to ensure that the model is not halted prematurely. For instance, if the rate of change of divergence is below the threshold for a certain consecutive number of steps of the model after being above the threshold at a previous step, the model can be allowed to continue outputting predictions.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
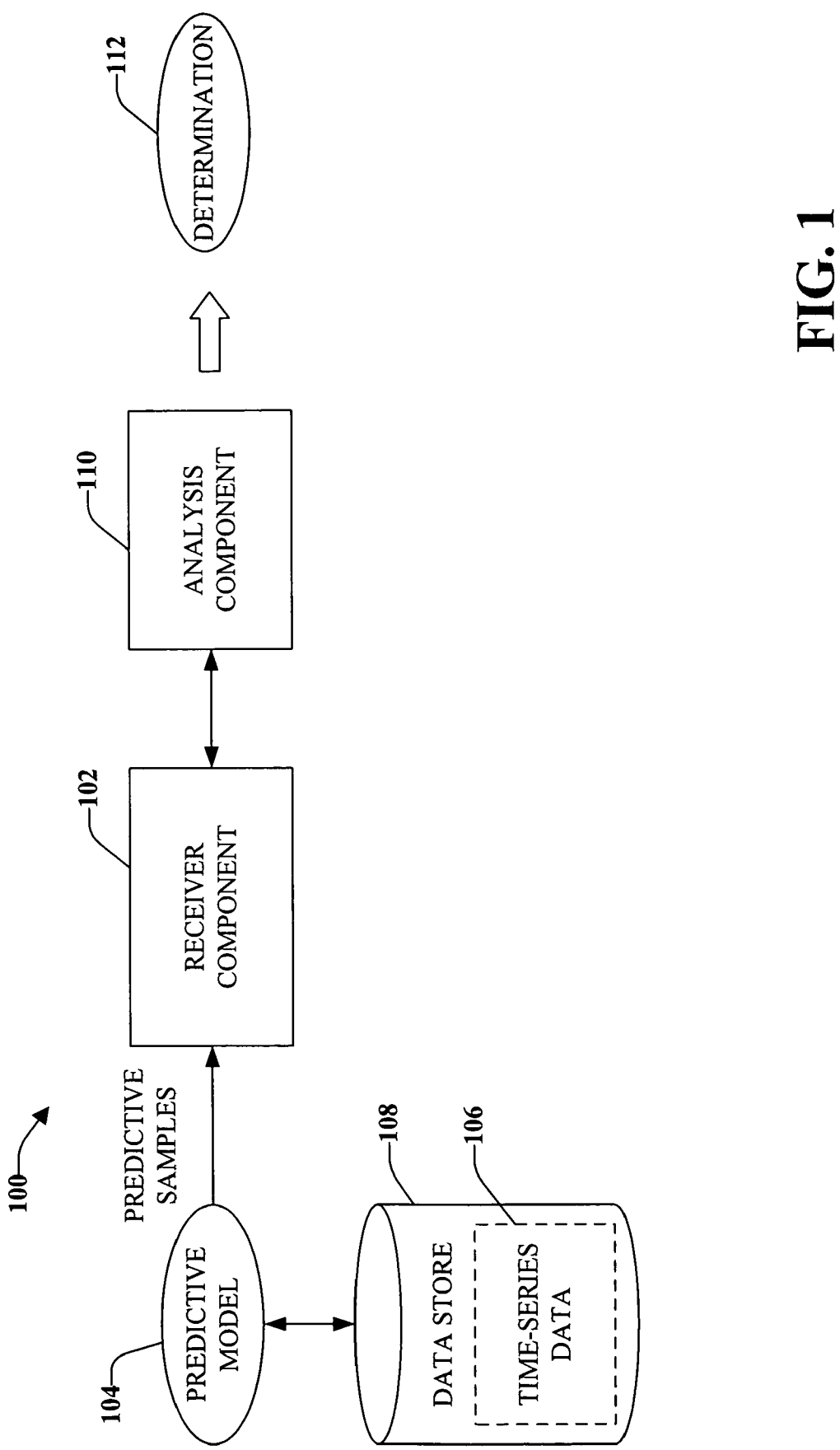
FIG. 1 is a high-level system block diagram of a predictive model analysis system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

The claimed subject matter will now be described with respect to the drawings, where like numerals represent like elements throughout. Referring now to FIG. 1, a system 100 that facilitates determining a distance in time with respect to which a predictive model can generate reliable predictions with respect to a particular data set is illustrated. In other words, the system 100 can be employed to determine when data becomes unstable when utilizing forward sampling to generate predictions, wherein forward sampling refers to treating predicted values as actual values to predict values for at least one variable at a future time. Forward sampling will be described in more detail herein.

The system 100 includes a receiver component 102 that receives predictive samples from a predictive model 104, wherein the predictive model can be, for example, an autoregressive predictive model. Autoregressive predictive models are employed to predict a value of at least one variable associated with time-series data, wherein the predicted value(s) of such variable can depend upon earlier values (predicted or observed) with respect to the same variable. For example, a predicted price of a stock may be a function of such stock at a previous point in time as well as price of related stocks. The predictive model 104 can generate a probability distribution over a target variable given previous observed values and output a prediction based at least in part upon the probability distribution. For instance, the predictive model 104 can be an autoregressive model that employs forward sampling to predict values for values at future instances in time. In an even more specific example, the predictive model 104 can be an autoregression tree model that employs forward sampling to predict future values for variables. Use of forward sampling in connection with the predictive model 104 may be desirable due to simplicity of undertaking such forward sampling, which enables predicted values to be treated as observed values.

A probability distribution can be created by the predictive model 104 with respect to a first prediction at a first instance in time in the future, and a sample can be randomly drawn from the distribution. This sample value can then be treated as an observed value for the variable at the first point in time, and can be used to create another probability distribution for the variable at a second point in time. A sample can again be randomly obtained from the distribution, and such sample can be treated as an observed value at the second point in time. This can continue until a probability distribution is obtained for the variable at a desired point in time in the future. The process can then repeat a substantial number of times to enable more accurate prediction of future values. More particularly, a string of predicted data points over time can be one step through the predictive model 104. If the model 104 is stepped through several times, the empirical mean value for the desired point in time will be a most probable mean value, and can be employed as a prediction for the variable at the point in time. Similarly, given sufficient data points, an accurate variance can be obtained.

While autoregressive predictive models can be quite useful in practice, use of such models can result in unstable predictions (e.g., predictions that are highly inaccurate). The system 100 (and other systems, apparatuses, articles of manufacture, and methodologies described herein) alleviates such deficiencies by determining points in time in the future with respect to one or more variables where predictions become unreliable. Conventionally, a typical manner to determine when in time autoregressive predictive models output unreliable predictions is to compare predicted values with actual values over time. Often, however, businesses or entities undertake action based upon predicted values, and thus irreparable damage may already have occurred prior to learning that a predictive model 104 is unable to predict values for variables with reliability a threshold amount of time into the future.

As stated above, the system 100 includes a receiver component 102 that receives one or more predictive samples from the predictive model 104, wherein the samples relate to values of at least one variable. The predictive model 104 can be built based at least in part upon time-series data 106 within a data store 108 and/or can access the data store 108 to retrieve observed values that can be utilized in connection with predicting values of a variable at points of time in the future. For example, the predictive values received by the receiver component 102 can be for a variable at a similar future instance in time and/or at disparate future instances in time. Moreover, the predictive values can be associated with disparate steps through the predictive model 104 and/or similar steps through the predictive model 104. Accordingly, it is understood that any suitable combination of predictive values can be received by the receiver component 102.

An analysis component 110 can be associated with the receiver component 102 and can estimate a rate of change of divergence associated with the predictive samples. For instance, the receiver component 102 and the analysis component 110 can be resident upon a server and/or a client device. In a particular example, two data strings associated with steps through the predictive model 104 can be compared to estimate rate of change of divergence associated with the predictive samples at certain instances in time. Divergence can be defined as a generic measure of how varied sampled values will be as a result of applying the forward sampling operator. As will be appreciated by one skilled in the art, variance or L1 distance can be employed as measures of divergence. In a particular example, after 100 samples, it can be estimated that the variance of time steps 2 and 3 is 1.00 and 1.02, respectively. Accordingly, the measured norm can be 2%, which is deemed acceptable. At time step 4, however, variance may be 4.32, which can be an unacceptable rate of change over the divergence of the third step. A more detailed explanation of one exemplary manner of estimating rate of change of divergence is provided below. If an estimated rate of change of divergence is above a threshold, the analysis component 110 can output a determination 112 that the predictive model 104 should not be employed to predict values for at least one variable at or beyond an at-issue instance in time. The analysis component 110 can stop operation of the predictive model 104 at such point, thereby prohibiting the predictive model 104 from providing a user with predictions that are associated with unstable data and/or unreliable predictions.

Figure 2:
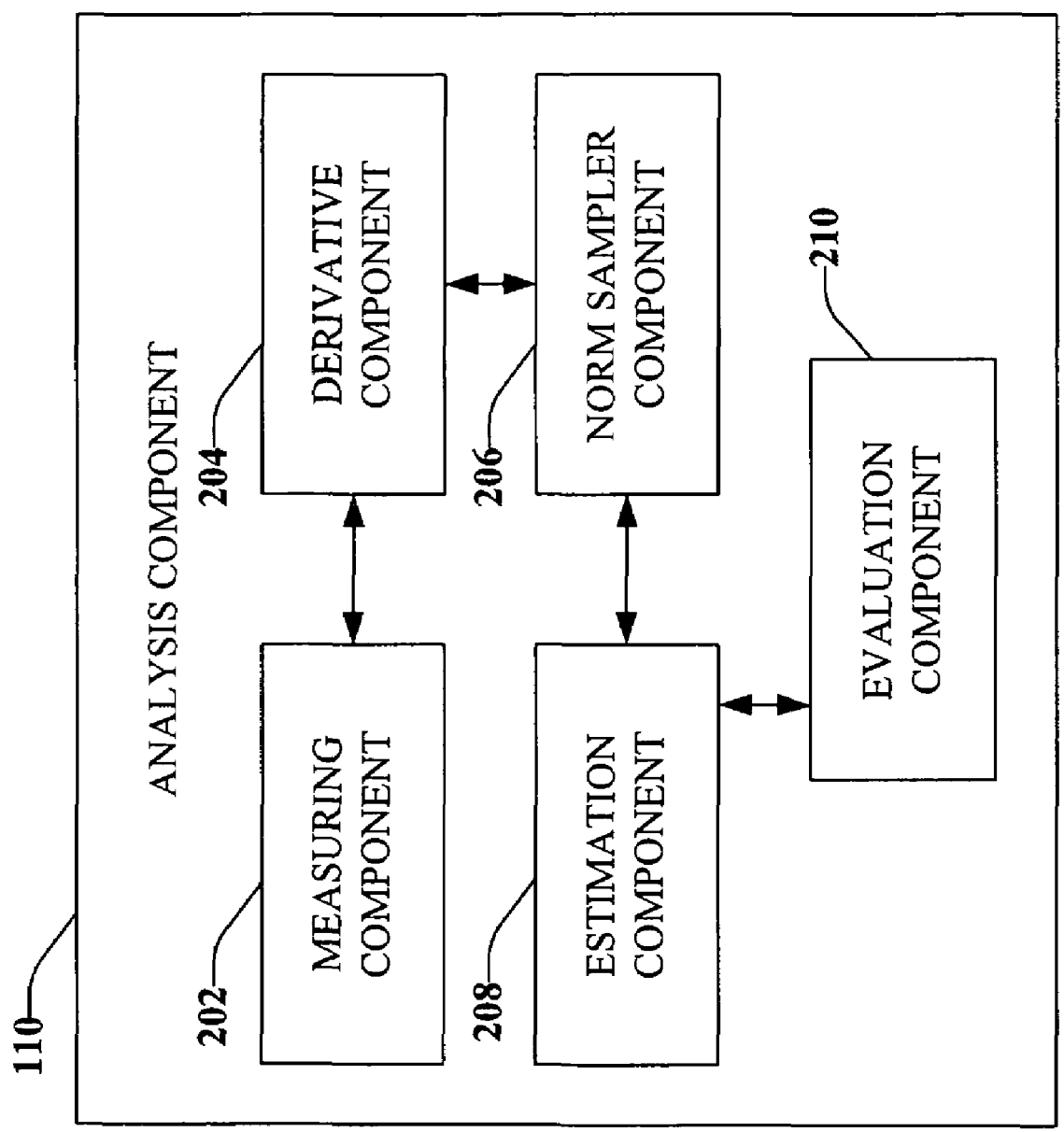
FIG. 2 is a block diagram of an analysis component that can be utilized in connection with analyzing a regressive predictive model.

Now referring to FIG. 2, the analysis component 110 (FIG. 1) is described in more detail. As stated above, the analysis component 110 receives a plurality of predictive samples and estimates a rate of change of divergence based at least in part upon such samples. Thereafter, the analysis component 110 can determine whether a predictive model can output reliable predictions at a particular distance in time into the future by analyzing the estimated rate of change of divergence. This estimation and analysis can be accomplished through employment of forward sampling operators. In more detail, the analysis component 110 includes a measuring component 202 that measures a norm of a forward sampling operator (FS) associated with a plurality of received predictive samples. In another example, the analysis component 110 can derive an estimated norm in closed form. Any suitable manner for deriving the norm is contemplated by the inventors and intended to fall within the scope of the hereto-appended claims. This measured norm can be employed to determine how possible divergence, accumulated by a certain prediction step in the predictive model 104 (FIG. 1), would grow or shrink at a subsequent prediction step.

More specifically, an autoregressive predictive model can be analyzed by the analysis component 110 with respect to a time series X(t). For instance, the autoregressive predictive model may be an autoregressive tree model (M), which is a collection of autoregression trees designed to estimate a joint distribution of X(t+1) given observed values up to point t. The model (M) can be employed to predict values for further points in time (e.g., X(t+2), X(t+3), . . . ) through utilization of a forward sampling algorithm. On exemplary forward sampling algorithm is described herein; however, it is understood that other forward sampling algorithms can be utilized in connection with one or more aspects described herein.

First, a joint distribution estimate of X(t+1) can be determined by applying a predictive model to available historic (observed) data x(0), x(1), . . . x(t). Thereafter, a suitable number of random samples NS can be drawn from the distribution and denoted as {x(t+1)(1), . . . , x(t+1)(NS)}. It can be assumed that joint distribution estimates X(t+1), . . . X(t+j), 1≦j<k has been built along with a matrix of random samples {{x(t+1)(1), . . . , x(t1)(NS)}, {x(t+1)(1), . . . x(t+j)(NS)}}, where j is a current step in the predictive model and k is a last step of the predictive model. At a j+1 step, an empty row can be added to the matrix of samples.

Simulated and observed historic data (x(0), . . . x(t), x(t+1)(i), . . . , x(t+j)(i)) can then be considered for each i, where 1≦i≦NS. It can be discerned that a first t+1 points are observed values while the remainder are received from the matrix of samples. The model (M) can then be applied to this history, thereby yielding a joint distribution estimate (estimate number i) for X(t+j+1). An x(t+j+1)(i) value can then be obtained by drawing a random sample from the joint distribution estimate for X(t+j+1). The sample can then be appended to the j+1 row of matrix samples, j can be incremented, and the process can be repeated until j+1=k.

Each utilization of the above algorithm can be viewed as an application of the forward sampling operator (FS) for each j (FS(j)) to previously collected distributions and samples. In other words, employment of FS(j) to estimates (j) yields estimates (j+1). Prediction errors and uncertainty accumulated in estimates (j) are caused by noise in original data as well as non-stationarity and/or non-linearity of data underlying such predictions. Thus, it is important to determine whether divergence accumulated in estimates (j) are likely to be inflated or deflated at j+1, as well as a probability associated with possibility of deflating divergence to an acceptable magnitude after inflated divergence over a number of steps.

The analysis component 110 can make such determinations through analyzing the norm of the forward sampling operator |FS(j)|. The norm of the forward sampling operator can be defined as the change in divergence from time j to time j+1. Accordingly, it can be discerned that the definition of |FS(j)| depends upon what is being employed as the measure of divergence (e.g., variance, L1, . . . ). In general FS(j) is a non-linear operator, so the analysis component 110 can include a derivative component 204 that is employed to analyze norms of derivatives of FS(j). More specifically, if FS is a non-linear forward sampling operator, s is a certain sample in its domain, and e is a finite sampling error, then $$FS'(e) = \lim_{h \to 0}$$
$$= \frac{FS(s + h \cdot e) - FS(s)}{h}, \text{ and}$$
$$|FS'|_s = \sup\left\{\frac{|FS'_s(e)|}{|e|} : e =!= 0\right\},$$

which is the norm of the operator at sample s. A norm sampler component 206 can be employed to select the sample s and undertake such calculation.

Thereafter, expected inflation or deflation rate of divergence in the course of forward sampling can be measured as an expectation of |FS'|. In other words, |FS(j)| can be defined as Divergence(j+1)/Divergence(j), where "Divergence" is a generic measure over points in a set of samples. An estimation component 208 can then be employed to calculate an estimated inflation or deflation rate of divergence in course of forward sampling. For instance, the estimation component 208 can compute the expectation of |FS'| (E(|FS'|)) through the following algorithm:

$$E(|FS'|) = \frac{\sum |FS'|_s}{N},$$

where N is a number of samples. As described above, there can exist a matrix of prediction samples built in a forward sampling loop, thus rendering enabling collection of statistics and generation of a sequence of norm estimates, which can be defined as $\vec{v}[j]=E(|FS(j)'|)$, $1 \leq j < k$.

If the observed time series data allowed strictly linear models and it is desirable to exclude divergence information for a finite number of steps, it can be required that $\vec{v}[j] \leq 1$ for all j=1, 2, . . . k−1. For instance, an evaluation component 210 can be employed to ensure that such values remain below the threshold of 1. In practice, however, nonlinearity and model tree splits add complexity to norm-based measures, which can yield norm values greater than 1 in healthy and highly usable models. Thus, the evaluation component 210 can ensure that that $\vec{v}[j] \leq (1+\text{tolerance})$ for most j=1, 2, . . . k−1. The "most" quantifier may be important, as when there is a split in an autoregression tree describing a switch from a low magnitude pattern to a high magnitude pattern, the norm estimate can yield an arbitrarily large value (even though the forward sampling process may be stable). For instance, if most samples at step j were generated using a low-magnitude pattern, and most samples at j+1 were generated using a high magnitude pattern, if the relative divergence rates are, on average, substantially similar for both patterns, and if a typical magnitude ratio between the patterns is L>1, then the norm estimate may be comparable to L, even when the relative divergence rates stays the same. In another example, the evaluation component 210 can require that each instance of apparent divergence inflation with $\vec{v}[j]>(1+\text{tolerance})$ be followed by a threshold number of divergence deflation with $\vec{v}[m]<1$, m=j+1, . . . This enables recovery from potential instability in a forward sampling process, regardless of reason (s) for divergence inflation.

In summary, the analysis component 110 can include the measuring component 202 which defines a forward sampling operator. The derivative component 204 can be employed to analyze a derivative of the forward sampling operator given a particular finite sampling error and a particular sample. The norm sampler component 206 can calculate a norm of the derivative of the forward sampling operator. The estimation component 208 can utilize a collection of such norms to estimate a rate of change of divergence at particular steps of a predictive model. The evaluation component 210 can then analyze the estimates to determine whether the predictive model can output valuable predictions.

Figure 3:
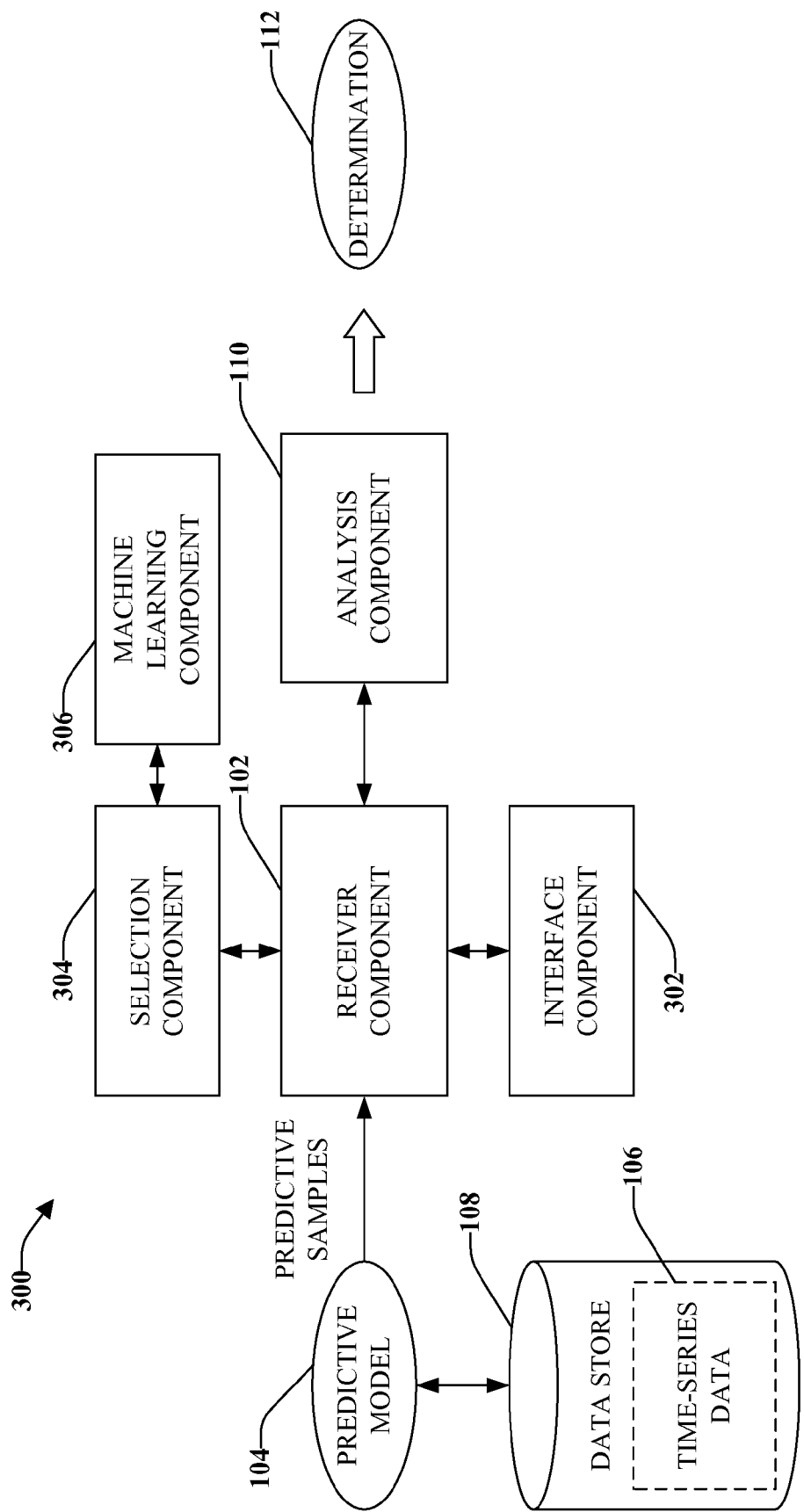
FIG. 3 is a block diagram of a predictive model analysis system.

Now referring to FIG. 3, a system 300 for determining usability of a predictive model at particular points in the future is illustrated. The system 300 includes the receiver component 102, which receives a plurality of predictive samples from the predictive model 104. An interface component 302 can be employed to interface the predictive model 104 to the analysis component 110. For instance, the predictive model 104 can be a pre-existent predictive model, and the analysis component 110 can be desirably associated with the predictive model 104 to determine reliability of the predictive model at future instances in time. For instance, the interface component 302 can be a combination of hardware and software that enables the analysis component 110 to operate in conjunction with the predictive model 104. In another example, the predictive model 104 can exist upon a server while the analysis component 110 can be resident upon a client. The interface component 302 can be hardware and/or software that enables the predictive model 104 and the analysis component 110 to communicate with one another so as to enable provision of predictive samples to the analysis component 110.

The system 300 further includes a selection component 304 that determines a number of samples to be provided to the analysis component 110. The selection component 304 can be associated with a machine learning component 306 that can make inferences regarding a number of samples to be provided to the analysis component 110 as dictated by the selection component 304. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter. Thus, for instance, based on implicit or explicit speed requirements associated with the predictive model 104, as well as user identity and/or computing context, the machine-learning component 306 can make an inference regarding a suitable number of samples for the analysis component 110. The selection component 304 can then utilize the inferences to inform the receiver component 102 a number of samples to provide to the analysis component 110.

Figure 4:
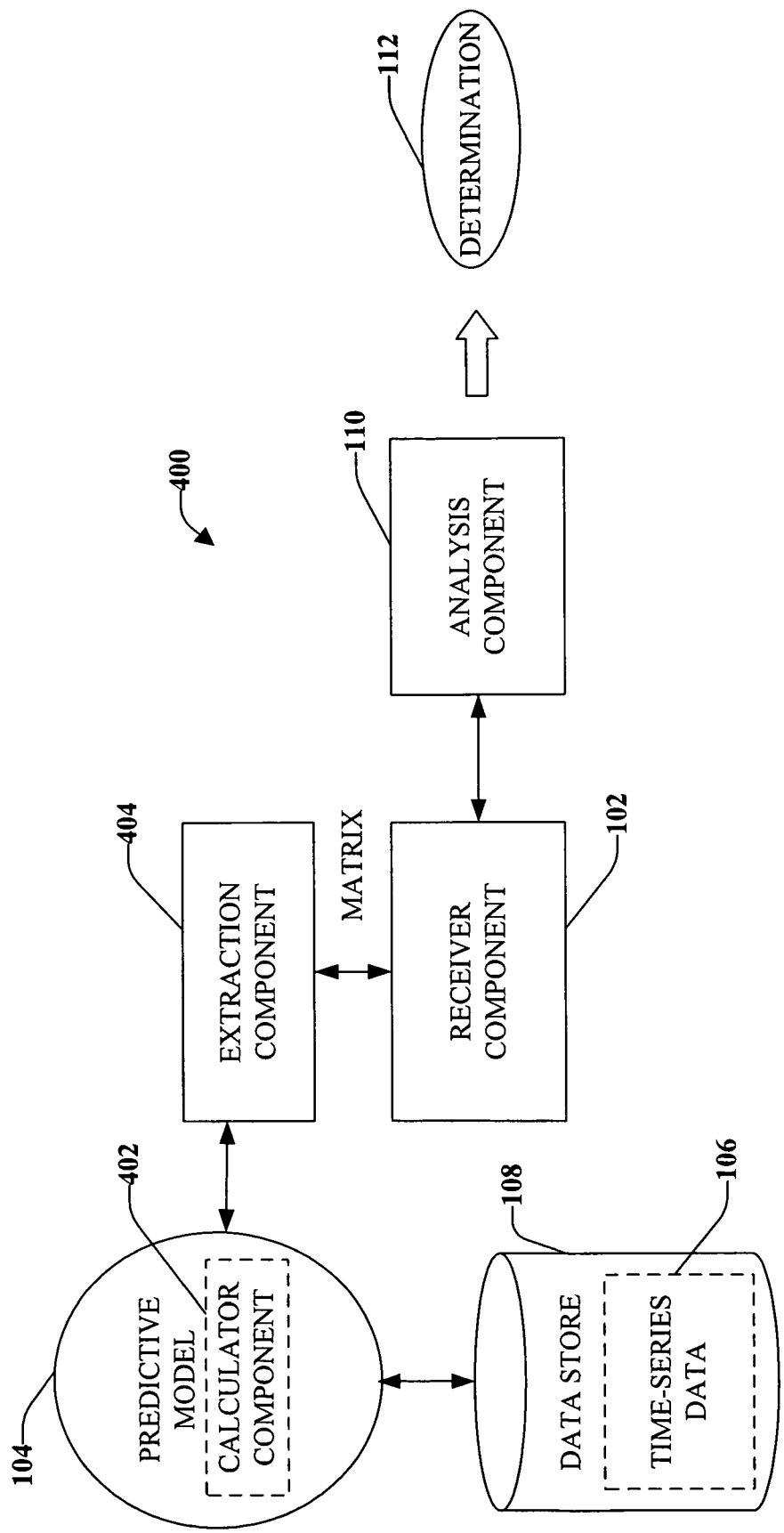
FIG. 4 is a block diagram of a system that facilitates extracting predictive samples associated with a predictive model.

Now referring to FIG. 4, a system 400 for analyzing an autoregressive predictive model to determine a distance in the future the predictive model can output valuable predictions is illustrated. The system 400 includes the predictive model 104, which can comprise a calculator component 402. The calculator component 402 can be employed to compute a joint distribution for a step within the predictive model 402. For instance, given observed values $x(0), \ldots x(t)$, the calculator component 402 can generate a joint distribution for $x(t+1)$. Further, as described above, the predictive model 104 can utilize forward sampling, thereby enabling prediction of values for time-series variables beyond t+1. Thus, joint distributions can be computed by the calculator component 402 for one or more variables with respect to several future instances in time. The system 400 can further include an extraction component 404 that randomly extracts a defined number of predictive samples from within the calculated joint distribution and inserts them into a matrix that includes samples associated with disparate joint distributions. The matrix can then be provided to the receiver component 102, which in turn can selectively provide entries to the analysis component 110.

Use of the matrix enables collection of statistics relating to forward sampling as well as generation of a sequence of norm estimates.

Figure 5:
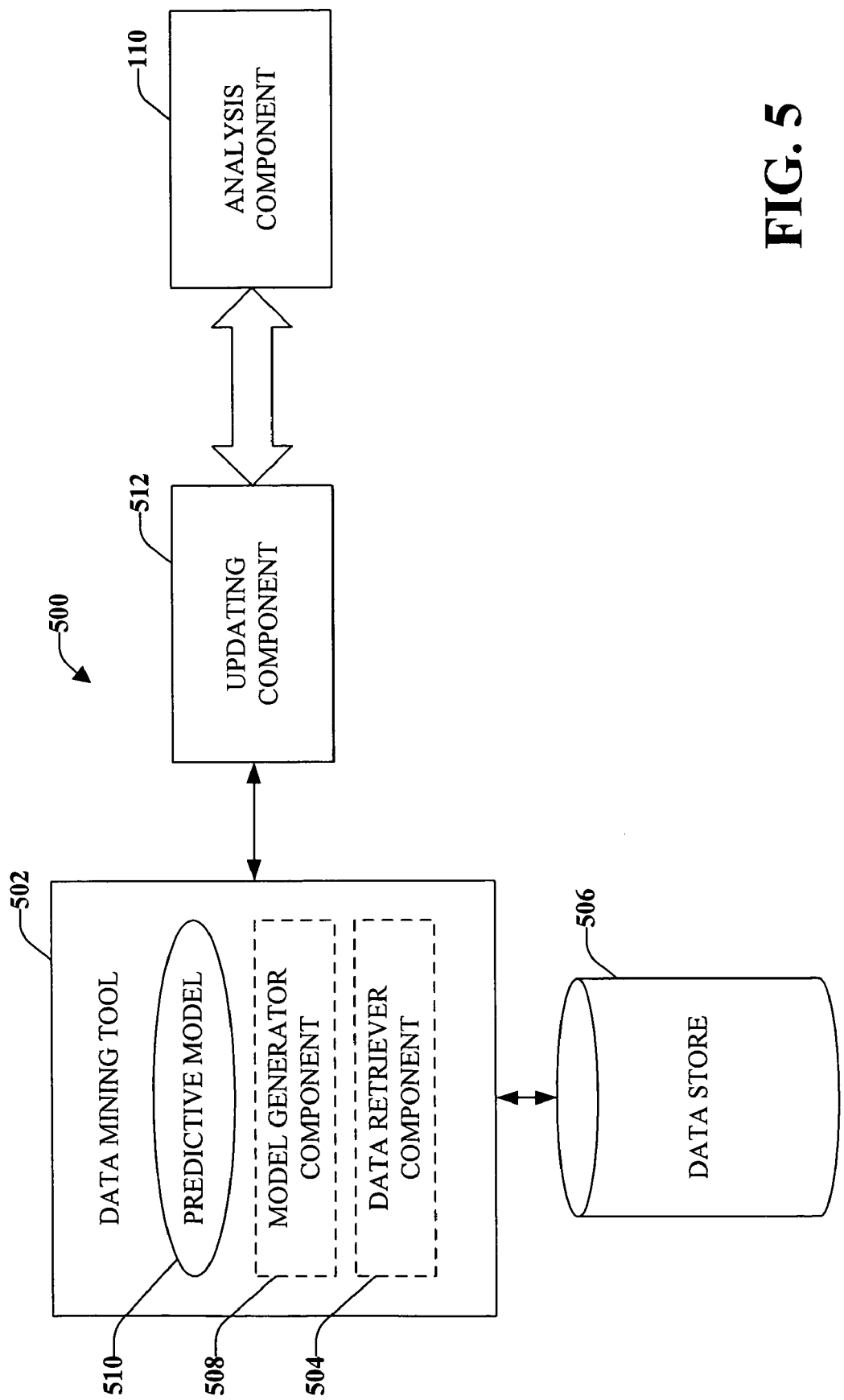
FIG. 5 is a block diagram of a system that facilitates associating an existent predictive model with an analysis tool.

Turning now to FIG. 5, a system 500 that facilitates updating an existent data mining tool with the analysis component 110 is illustrated. The system 500 includes a data mining tool 110 that can be sold as a stand-alone application for use with data within a data repository. The data mining tool 502 can include a data retriever component 504 that is employed to retrieve data from one or more data stores 506. For instance, the data store 506 can include time-series data that can be utilized to predict future variables of particular variables within the data. The data mining tool 502 can further include a model generator component 508 that can analyze the data and build a predictive model 510 based at least in part upon the analysis. For example, the model generator component 508 can analyze variables in the data and recognize trends. Based at least in part upon the trends, the model generator component 508 can create the predictive model 510.

The data mining tool 502 can be associated with an updating component 512 that can be employed to update the data mining tool 502 with the analysis component 110. For instance the analysis component 110 can exist upon the Internet or an intranet, and can be accessed by the updating component 512. The updating component 512 can then associate the analysis component 110 with the predictive model 510 in order to enable the analysis component 110 to determine a distance into the future in which the predictive model 510 can accurately generate predictions. The updating component 512 can be automatically implemented upon operating the data mining tool 502. For instance, the data mining tool 502 can be associated with a web service that causes the updating component 512 to search for the analysis component 110 and associate the analysis component with the predictive model 510. Similarly, a user can prompt the updating component 512 to locate the analysis component 110 and associate such component 110 with the predictive model 510.

Referring now to FIGS. 6-9, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
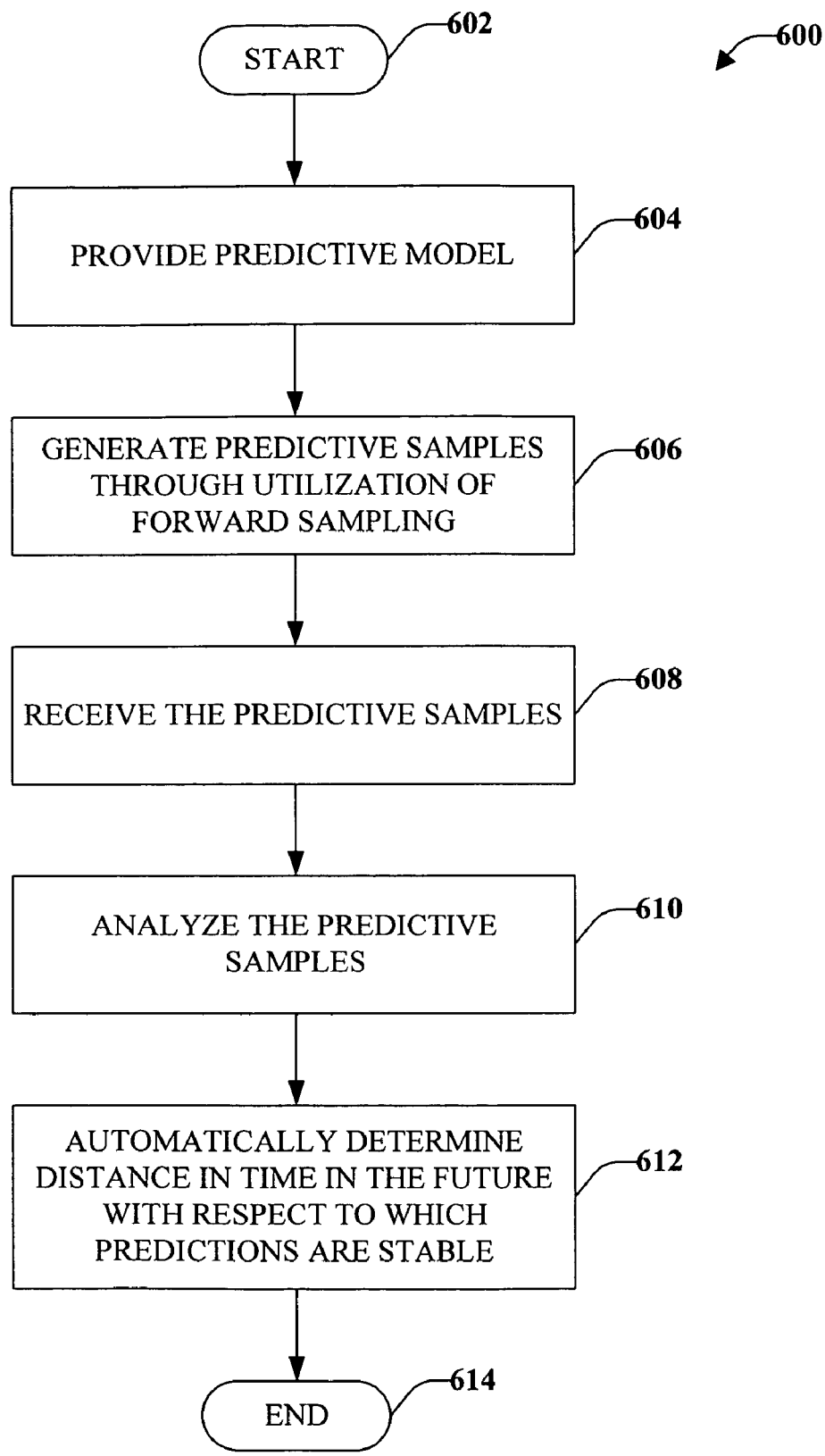
FIG. 6 is a representative flow diagram illustrating a methodology for determining when predictions are no longer valuable/useful.

Referring specifically to FIG. 6, a methodology 600 for determining distance in the future that a predictive model can output valuable predictive values is illustrated. The methodology 600 starts at 602, and at 604 a predictive model is provided. For example, the predictive model can be an autoregression tree predictive model that can employ forward sampling in connection with predictive values for variables at future points in time. At 606, predictive samples can be generated through utilization of forward sampling. For instance, observed values can be employed to create predicted values for future points in time. These predictive values can then be treated as observed values for purposes of predicting variable values at instances further in time.

At 608, the predictive samples are received from the predictive model, and at 610 the predictive samples are analyzed. For instance, the predictive samples can be analyzed to determine an estimate of rate of change of divergence associated with the samples. In more detail, a norm of a forward sampling operator can be determined and analyzed for the predictive samples, and such norm can be employed in determining the estimated rate of change of divergence. At 612, distance in time in the future with respect to which predictions are valuable is determined. This determination can be transparent to a user, wherein a predictive model's last output prediction is one that is determined valuable and/or reliable. The methodology 600 then completes at 614.

Figure 7:
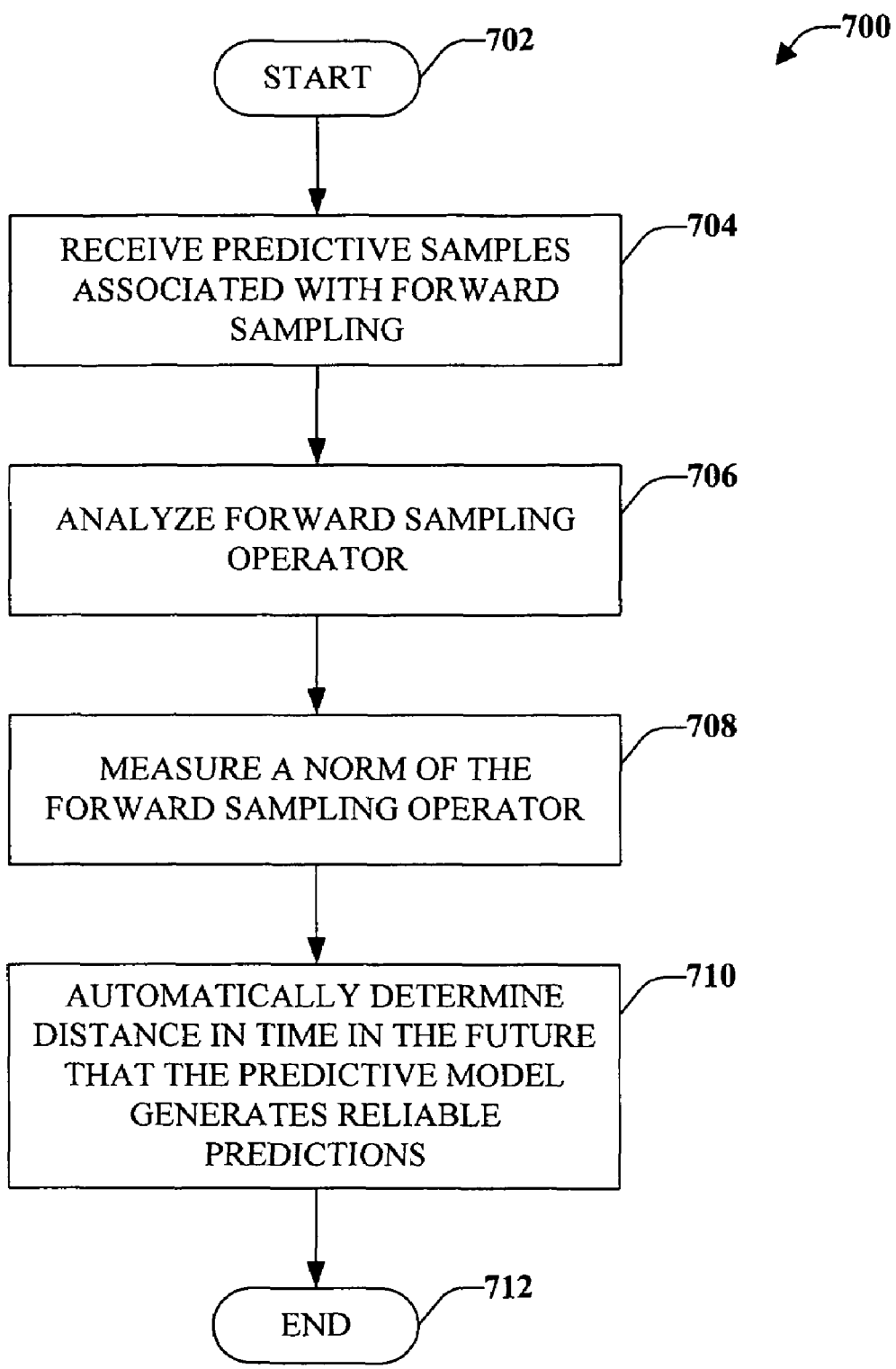
FIG. 7 is a representative flow diagram illustrating methodology for determining a step in a predictive model that is associated with data instability.

Now turning to FIG. 7, a methodology 700 for determining a step in time associated with a data mining model with respect to which data becomes sufficiently unstable to prohibit useful predictions is illustrated. The methodology 700 starts at 702, and at 704 predictive samples are received. With more specificity, the predictive samples can be created through employment of one or more forward sampling algorithms. At 706, a forward sampling operator associated with the received predictive samples is analyzed. For instance, as data associated with the predictive samples may be non-linear, it may be desirable to analyze a derivative of the forward sampling operator. Analysis of a forward sampling operator is described above with respect to FIG. 2. At 708, a norm of the forward sampling operator is measured. For example, the norm can be measured through utilization of one or more specific samples, which can be representative of a global norm. At 710, distance in time into the future that the predictive model generates useful, reliable predictions can be determined based at least in part upon the analyzed forward sampling operator and/or the measured norm. Thus, rather than being uncertain of how many steps a predictive model can undertake while outputting useful predictions, the methodology 700 enables such model to be tested and analyzed, thereby avoiding various pitfalls associated with conventional predictive models. The methodology 700 completes at 712.

Figure 8:
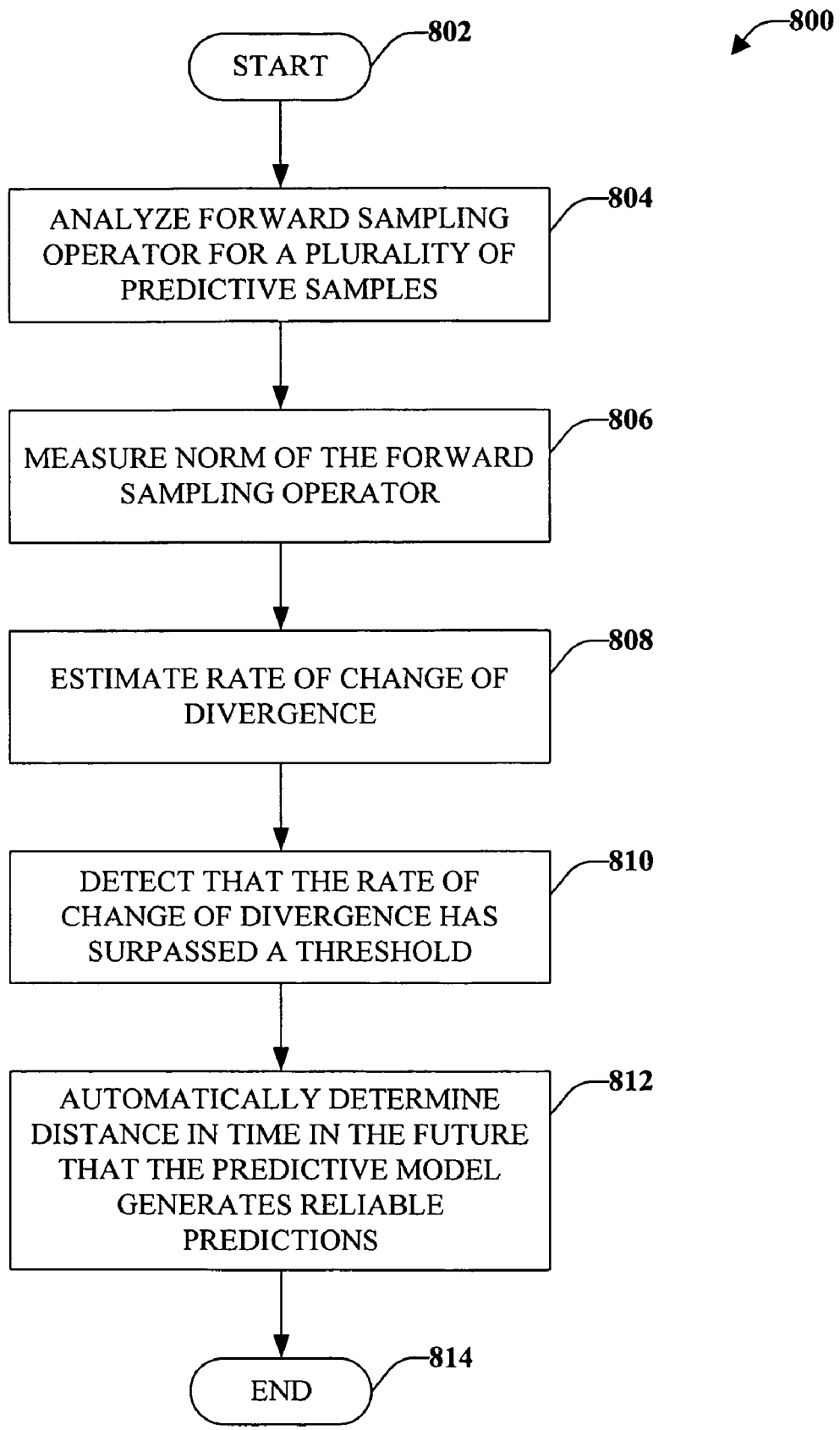
FIG. 8 is a representative flow diagram illustrating a methodology for determining distance in time in the future that a predictive model can generate reliable predictions.

Referring now to FIG. 8, a methodology 800 for analyzing a predictive model is illustrated. The methodology 800 initiates at 802, and at 804 a forward sampling operator with respect to a predictive model is analyzed. For instance, the analysis can be undertaken based at least in part upon a plurality of received predictive samples, wherein such samples were obtained through utilization of forward sampling with respect to the predictive model. At 806, a norm of the forward sampling operator is determined. For example, the norm can be a local norm of the forward sampling operator at a particular sample, and can be considered a sample value of a global norm of a derivative of the forward sampling operator. At 808, a rate of change of divergence is estimated based at least in part upon the analyzed norm. At 810, a detection is made indicating that the rate of change of divergence has surpassed a particular threshold. For example, the threshold can be a particular number (e.g., 1.3), a number combined with a number of times that the rate of change of divergence must be below such number consecutively, or any other suitable threshold. At 812, an automatic determination is made regarding a number of steps that the predictive model can undertake prior to outputting unreliable predictions. This methodology 800 can, once implemented, be completely transparent to a user and can operate automatically upon implementation of a predictive model. The methodology 800 enables a determination regarding when a predictive model should be halted and no further predictions are output. The methodology 800 completes at 814.

Figure 9:
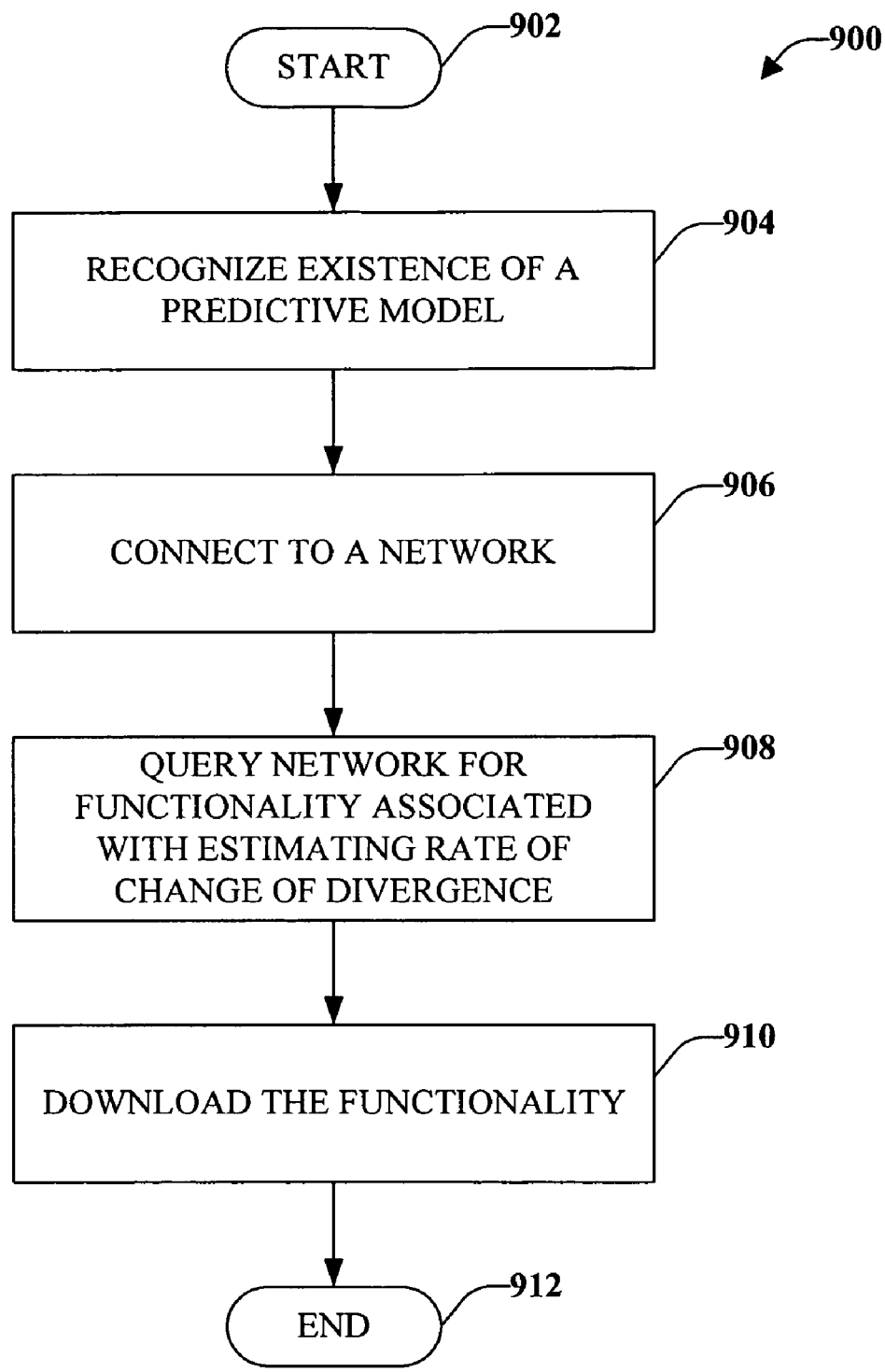
FIG. 9 is a representative flow diagram illustrating a methodology for downloading predictive model analysis functionality.

Turning now to FIG. 9, a methodology 900 for associating functionality for estimating rate of change of divergence with an existent predictive model is illustrated. The methodology 900 starts at 902, and at 904 existence of a predictive model is recognized. For instance, a web service or other suitable tool can recognize existence of a data mining tool upon a computing device, wherein the data mining tool includes a predictive model that employs forward sampling to generate predictions. At 906, after recognition of the predictive model, a network connection can be made. For instance, this connection can be made over the Internet or intranet. At 908, the network is queried for functionality associated with estimating rate of change of divergence. For example, particular domain can be queried for existence of the functionality. At 910, the functionality is downloaded and placed upon the querying device, and is further associated with the predictive model. The methodology 900 then completes at 912.

Figure 10:
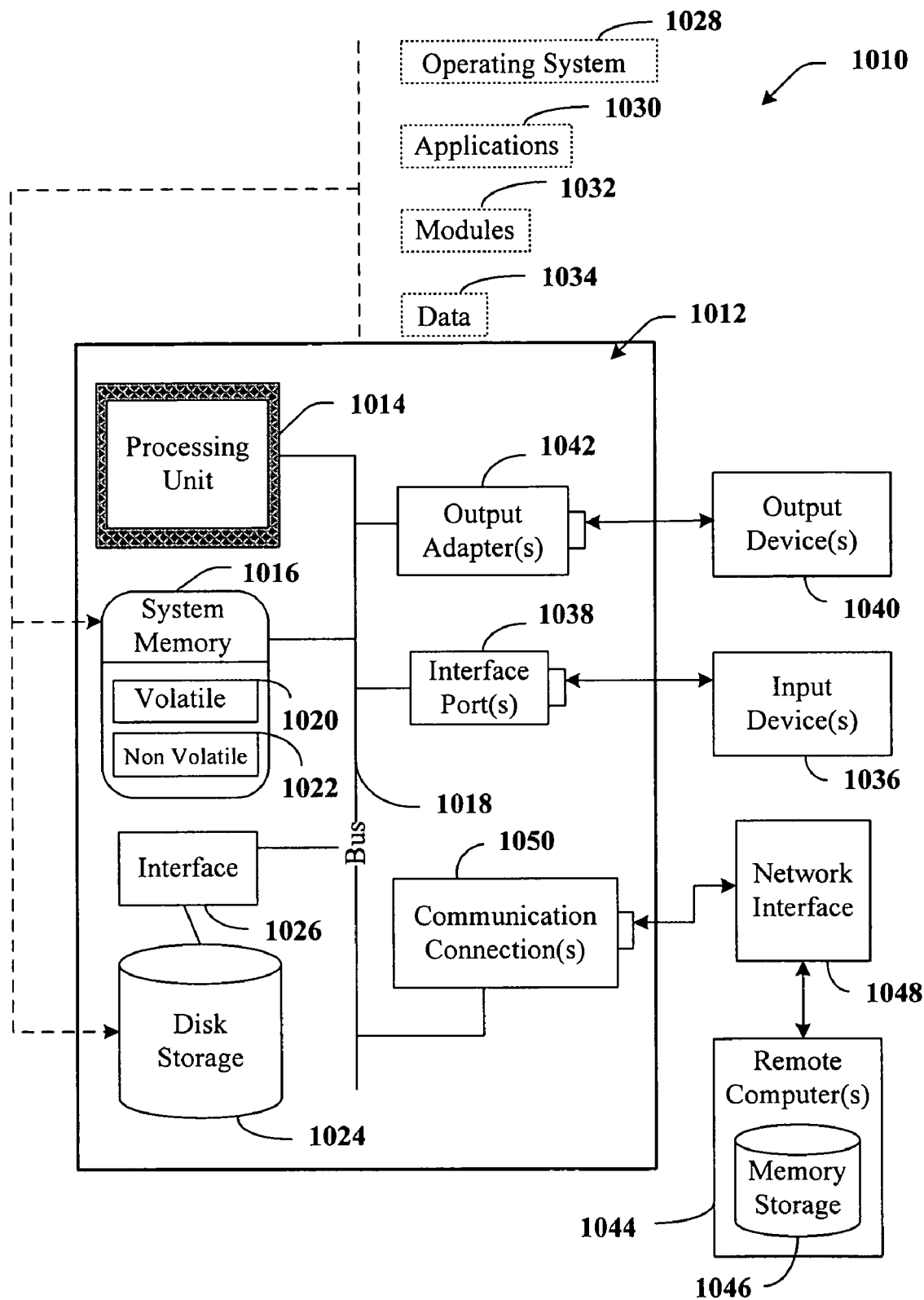
FIG. 10 is a schematic block diagram illustrating a suitable operating environment.

In order to provide additional context for various aspects of the claimed subject matter, FIG. 10 and the following discussion are intended to provide a brief, general description of a suitable operating environment 1010 in which various aspects of the claimed subject matter may be implemented. While the claimed subject matter is described in the general context of computer-executable instructions, such as program modules, executed by one or more computers or other devices, those skilled in the art will recognize that such subject matter can also be implemented in combination with other program modules and/or as a combination of hardware and software.

Generally, however, program modules include routines, programs, objects, components, data structures, etc. that perform particular tasks or implement particular data types. For example, these routines can relate to identifying an item and defining a group of items upon identifying such item and providing substantially similar tags to each item within the group of items. Furthermore, it is understood that the operating environment 1010 is only one example of a suitable operating environment and is not intended to suggest any limitation as to the scope of use or functionality of the claimed subject matter. Other well known computer systems, environments, and/or configurations that may be suitable for use with features described herein include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects described herein includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024, which can be employed in connection with storage and retrieval of items associated with various applications. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
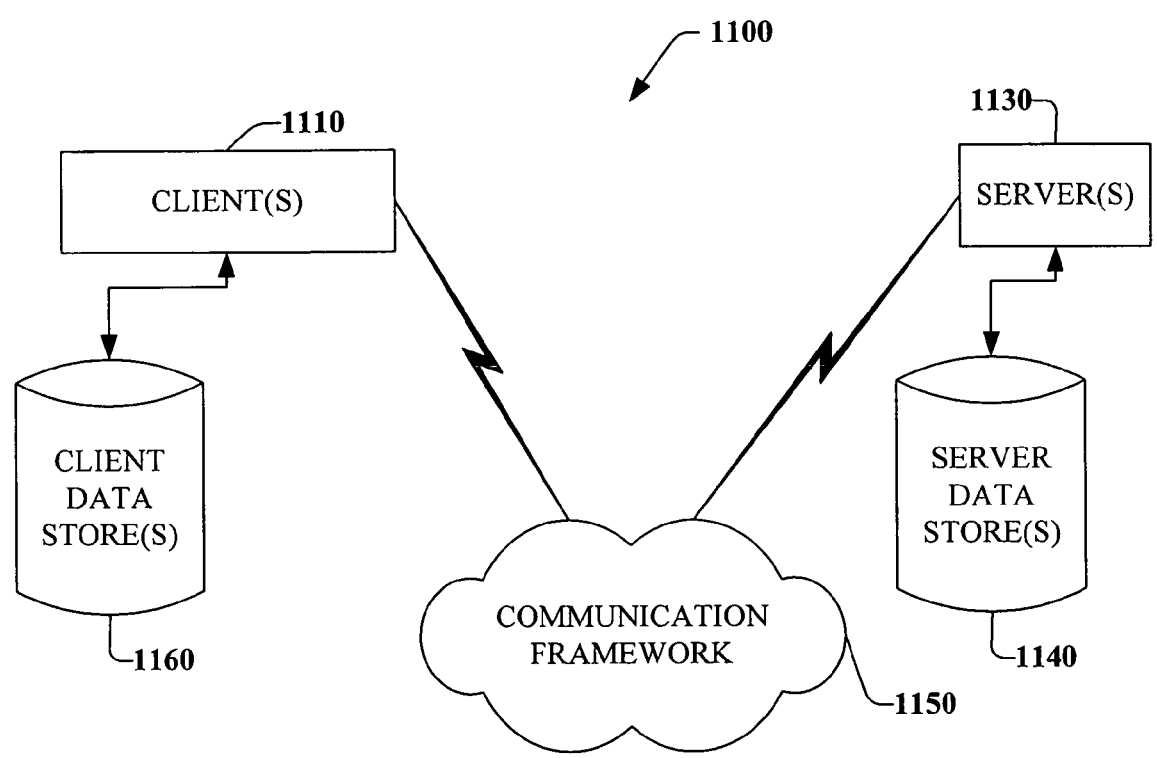
FIG. 11 is a schematic block diagram of a sample-computing environment.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing various features described herein, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130. In one example, the server(s) 1130 can include a predictive model and data associated utilized for predictions. The client(s) 1110 can be employed to query the server(s) 1130 to obtain predictions.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data monitoring system embodied on a computer readable storage medium that comprises the following computer-executable components:
   a receiver component that receives a plurality of predictive samples from a predictive model created by way of forward sampling of one or more previously made predicted samples from the predictive model, the forward sampling creating the one or more previously made predicted samples by:
      generating, by the predictive model, a first probability distribution to make a first prediction for a variable at a first instance in time in a future;
      randomly drawing a sample from the probability distribution that is treated as an observed value for the variable at the first instance in time;
      using the observed value to create a second probability distribution for the variable at a second instance in time in the future; and
      continuing the generating, the randomly drawing, and the using the observed value until a subsequent probability distribution is obtained for the variable at a predetermined instance in time in the future; and
   an analysis component that analyzes a plurality of the received predictive samples and automatically determines whether the predictive model is reliable at a time range associated with the plurality of received predictive samples, the determination is based at least in part upon a rate of change of divergence of a forward sampling operator (FS) associated with the predictive model based upon the plurality of received predictive samples, the determination further analyzing the rate of change of divergence with respect to a threshold, wherein the analysis component:
      determines that the predictive model is outputting reliable predictions at a certain instance of time in the future and allowing the predictive model to continue outputting predictions when the rate of change of divergence is below the threshold;
      determines that the predictive model is not outputting reliable predictions at a certain instance of time in the future and halts the predictive model from outputting predictions subsequent to that certain instance of time when the rate of change of divergence is above the threshold; and
      determines that the predictive model is outputting reliable predictions at a first instance of time in the future and allowing the predictive model to continue outputting predictions when the rate of change of divergence is above the threshold at the first instance of time and when the rate of change of divergence is below the threshold at a certain consecutive number of instances of time subsequent to the first instance of time.

2. The system of claim 1, wherein the analysis component comprises a measuring component that determines the forward sampling operator (FS).

3. The system of claim 2, wherein the analysis component further comprises a derivative component that creates a derivative of FS, (FS').

4. The system of claim 3, wherein the analysis component derives an estimated norm in closed form.

5. The system of claim 4, wherein the analysis component further comprises an estimation component that estimates the rate of change of divergence by determining an expectation of |FS'|, where $$E(|FS'|) = \frac{\sum |FS'|_s}{N},$$

where $E(|FS'|)$ is an expectation of $|FS'|$ and N is a number of the received predictive samples.

6. The system of claim 5, wherein the estimation component creates a sequence of norm estimates through creation of a vector of norm estimates, $\vec{v}[j]$, where $\vec{v}[j]=E(|FS(j)'|)$, $1 \leq j < k$, where j relates to a time associated with a prediction and k is a constant.

7. The system of claim 6, further comprising an evaluation component that determines whether one or more entries in the vector of norm estimates are less than a predefined norm estimate threshold.

8. The system of claim 7, wherein the evaluation component determines that an entry in the vector of norm estimates is greater than the norm estimate threshold and monitors entries following the entry that is greater than the norm estimate threshold to ensure that a pre-defined threshold number of entries subsequent the entry are below the pre-defined norm estimate threshold, wherein the evaluation component allows the model to continue making subsequent predictions if the number of acceptable vector entries subsequent the entry are below the predefined threshold number of entries, and wherein the evaluation component deems a forward sampling prediction unstable and halts the model from making subsequent predictions if the number of acceptable vector entries subsequent the entry are below the predefined threshold number of entries.

9. The system of claim 1, further comprising a selection component that selects a number of predictive samples to be provided to the analysis component based upon inference of the current state of the system in order to meet speed requirements for the predictive model.

10. The system of claim 1, wherein the predictive model is an autoregressive predictive model.

11. The system of claim 1, further comprising a selection component that selects a number of predictive samples to be provided to the analysis component.

12. The system of claim 11, further comprising a calculator component that generates a joint distribution estimate with respect to time-series data at a future point in time, the predictive model comprises the calculator component.

13. The system of claim 1, further comprising a data store that includes time-series data, the predictive model accesses the time-series data and utilizes forward sampling to create the predictive samples.

14. The system of claim 1, wherein a server comprises the receiver component and the analysis component.

15. The system of claim 1, wherein a client comprises the receiver component and the analysis component.

16. A computer-implemented method for determining operability of a predictive model with respect to predicted values of variables at future instances in time, comprising the following computer-executable acts:
   receiving predictive values for a variable from a predictive model that are determined based upon forward sampling, wherein forward sampling comprises employing at least one previously predicted value from the predictive model as an observed value in predicting one or more additional values for the variable, the forward sampling creating the at least one previously predicted value by:
  generating, by the predictive model, a first probability distribution to make a first prediction for the variable at a first instance in time in a future;
  randomly drawing a sample from the probability distribution that is treated as the observed value for the variable at the first instance in time;
  using the observed value to create a second probability distribution for the variable at a second instance in time in the future; and
  continuing the generating, the randomly drawing, and the using the observed value until a subsequent probability distribution is obtained for the variable at a predetermined instance in time in the future; and
automatically determining a distance in time in the future that the predictive model will reliably predict values for the variable based at least in part upon an estimated rate of change of divergence of the received predictive values the automatically determining further comprising:
  determining that the predictive model is outputting reliable predictions at a certain instance of time in the future and allowing the predictive model to continue outputting predictions when the rate of change of divergence is below the threshold;
  determining that the predictive model is not outputting reliable predictions at a certain instance of time in the future and halts the predictive model from outputting predictions subsequent to that certain instance of time when the rate of change of divergence is above the threshold; and
  determining that the predictive model is outputting reliable predictions at a first instance of time in the future and allowing the predictive model to continue outputting predictions when the rate of change of divergence is above the threshold at the first instance of time and when the rate of chance of divergence is below the threshold at a certain consecutive number of instances of time subsequent to the first instance of time.

17. The method of claim 16, further comprising measuring a norm of a forward sampling operator that relates to a subset of the received predictive values, the automatic determination of the distance in time in the future is based at least in part upon the measured norm.

18. The method of claim 17, further comprising estimating a rate of change of divergence based at least in part upon the measured norm.

19. The method of claim 16, further comprising preventing the predictive model from making predictions when the rate of change of divergence is above a predefined threshold.

20. A system embodied on a computer readable storage medium that facilitates monitoring of a predictive model, comprising:
  computer-implemented means for receiving predicted values for at least one variable, the received predicted values obtained by way of forward sampling, wherein forward sampling comprises employing at least one previously predicted value from the predictive model as an observed value in determining one or more future predicted values for the at least one variable, the forward sampling creating the at least one previously predicted value by:
    generating, by the predictive model, a first probability distribution to make a first prediction for the at least one variable at a first instance in time in a future;
    randomly drawing a sample from the probability distribution that is treated as the observed value for the at least one variable at the first instance in time;
    using the observed value to create a second probability distribution for the at least one variable at a second instance in time in the future; and
    continuing the generating, the randomly drawing, and the using the observed value until a subsequent probability distribution is obtained for the at least one variable at a predetermined instance in time in the future;
  computer-implemented means for estimating a rate of change of divergence of a forward sampling operator (FS) associated with the predictive model based at least in part upon the received predicted values, wherein the rate of change of divergence is determined by an expectation of $|FS'|$, where $E(|FS'|)=\Sigma|FS'|_i/N$, where $E(|FS'|)$ is an expectation of $|FS'|$ and N is a number of the received predicted samples; and
  computer-implemented means for determining a received predicted value from the predictive model that is not accurate based at least in part upon the estimated rate of change of divergence exceeding a predefined threshold, the computer-implemented means for determining further comprising:
    determining that the predictive model is outputting reliable predictions at a certain instance of time in the future and allowing the predictive model to continue outputting predictions when the estimated rate of change of divergence is below the predefined threshold;
  determining that the predictive model is not outputting reliable predictions at a certain instance of time in the future and halts the predictive model from outputting predictions subsequent to that certain instance of time when the estimated rate of change of divergence is above the predefined threshold; and
  determining that the predictive model is outputting reliable predictions at a first instance of time in the future and allowing the predictive model to continue outputting predictions when the estimated rate of change of divergence is above the predefined threshold at the first instance of time and when the estimated rate of change of divergence is below the predefined threshold at a certain consecutive number of instances of time subsequent to the first instance of time.

* * * * *